United States Patent [19]

Sanpei

[11] Patent Number: 5,721,590
[45] Date of Patent: Feb. 24, 1998

[54] MOVING PICTURE DECODING CONTROL SYSTEM

[75] Inventor: Tatsuya Sanpei, Tokyo, Japan

[73] Assignee: NEC Corporation, Tokyo, Japan

[21] Appl. No.: 340,294

[22] Filed: Nov. 14, 1994

[30]  Foreign Application Priority Data

Nov. 12, 1993 [JP] Japan .................................. 5-282856

[51] Int. Cl.$^6$ ..................................................... H04N 7/32
[52] U.S. Cl. .......................... 348/419; 348/405; 348/415
[58] Field of Search ........................................ 348/419, 409, 348/412, 415, 400, 402, 426, 405; H04N 7/32

[56] References Cited

U.S. PATENT DOCUMENTS

| | | | |
|---|---|---|---|
| 4,562,466 | 12/1985 | Clapp et al. | 348/415 |
| 4,609,941 | 9/1986 | Carr et al. | 348/415 |
| 5,038,209 | 8/1991 | Hang | 348/419 |
| 5,134,476 | 7/1992 | Aravind et al. | 348/415 |
| 5,159,447 | 10/1992 | Haskell et al. | 348/419 |
| 5,241,383 | 8/1993 | Chen et al. | 348/409 |
| 5,305,102 | 4/1994 | Knaur et al. | 348/415 |
| 5,386,234 | 1/1995 | Veltman et al. | 348/409 |
| 5,398,072 | 3/1995 | Auld | 348/426 |
| 5,416,521 | 5/1995 | Chujoh et al. | 348/409 |
| 5,502,494 | 3/1996 | Auld | 348/402 |

FOREIGN PATENT DOCUMENTS

| | | | |
|---|---|---|---|
| 0309280A1 | 9/1988 | European Pat. Off. | H04N 7/32 |
| 0510640A2 | 10/1992 | European Pat. Off. | H04N 7/24 |
| 0551599A1 | 7/1993 | European Pat. Off. | H04N 7/32 |
| 0588586A2 | 9/1993 | European Pat. Off. | H04N 7/32 |
| 63-222592 | 9/1988 | Japan | H04N 7/24 |
| 63-22592 | 9/1988 | Japan | H04N 7/24 |
| 3211984 | 12/1991 | Japan | H04N 7/24 |
| WO9310627A1 | 5/1993 | WIPO | H04N 5/073 |

OTHER PUBLICATIONS

Assmus et al., "High-Quality Video and Audio Signal Transmission in a Broadband ISDN based on ATD" EBU Review_Technical No. 247 Jun. 1, 1991 pp. 124–131.

Primary Examiner—Tommy P. Chin
Attorney, Agent, or Firm—Whitham, Curtis, Whitham & McGinn

[57] ABSTRACT

In a moving picture decoding control system, when the amount of codes accumulated in a buffer memory is between first and second thresholds, the reading-out of the buffer memory is stopped and an image memory is repeatedly read out just after the I-picture or the P-picture of one frame is decoded until the amount of codes accumulated in the buffer memory exceeds the second threshold. When the amount of codes accumulated in the buffer memory is smaller than the first threshold, the reading-out of the buffer memory is stopped and the image memory is repeatedly read out until the amount of codes accumulated in the buffer memory exceeds the second threshold.

2 Claims, 6 Drawing Sheets

MOVING PICTURE DECODING CONTROL SYSTEM

BACKGROUND OF THE INVENTION

1. Field of the Invention

The present invention relates to a decoding system for decoding image codes and having a code buffer memory and an image memory for matching in speeds between a transmission rate and a decoding rate of encoded data. More specifically, the present invention relates to a system for controlling the code buffer memory and the image memory when the code amount is beyond an ordinary capacity of the code buffer memory.

2. Description of Related Art

In encoding moving pictures, a code buffer memory has been used for matching in speeds between a transmission rate and a decoding rate of encoded data. If the decoding rate of the encoded data is lower than the transmission rate of the encoded data, the encoded data is accumulated in the code buffer memory, and therefore, there is a fear that the code buffer memory overflows. If because of the overflow of the code buffer memory the encoded data is not stored in the code buffer memory and therefore is lost, it becomes impossible to continue the decoding. Hence substantial time may be required until a normal operation is restored. Therefore, in the case that there is a fear that the code buffer memory overflows, it is necessary to thin out the encoded data stored in the code buffer memory, in units which hardly influence the decoding, for example, in units of one frame, so that an image stored in the image memory is outputted in place of a decoded image to be properly outputted. With this countermeasure, the encoded data stored in the code buffer memory can be reduced.

On the other hand, if the decoding rate of the encoded data is higher than the transmission rate of the encoded data, the encoded data stored in the code buffer memory will be reduced, and therefore, there is a fear that the code buffer memory underflows. If the encoded data stored in the code buffer memory because of the underflow of the code buffer memory is lost, it becomes impossible to output a decoded image, so that the image becomes broken. Therefore, in order to avoid a break of the image, when there is a fear that the code buffer memory underflows, it is necessary to stop supplying the encoded data stored in the code buffer memory to a decoding unit, and to output an image stored in the image memory of the decoding unit, in place of a decoded image to be properly outputted. With this arrangement, the encoded data stored in the code buffer memory can be increased.

A conventional control of the code buffer memory will be explained with reference to FIG. 1.

The system shown in FIG. 1 includes a code buffer memory controller 601, a code buffer memory 602, a decoding unit 603, comparators 6041 and 6042, and an image memory 605, coupled to each other as shown. A threshold L1 is used in such a manner that, when an encoded data amount notice signal 6f becomes lower than this threshold L1, it is discriminated that there is possibility of the underflow. This threshold L1 is set to the amount of encoded data stored in the code buffer memory 602 during a period of one frame. A threshold L4 is used in such a manner that, when the encoded data amount notice signal 6f becomes larger than this threshold L4, it is discriminated that there is possibility of the overflow. This threshold L4 is set to a value obtained by subtracting the amount of encoded data stored in the code buffer memory 602 during a period of one frame, from a storage capacity of the code buffer memory 602.

If the code buffer memory controller 601 detects on the basis of an output of the comparator 6041 that the encoded data amount notice signal 6f becomes lower than the threshold L1, the code buffer memory controller 601 outputs a code buffer memory control signal 6a to the code buffer memory 602 when the decoding unit 603 has completed the decoding of a frame under decoding, so that a reading-out of the code buffer memory 602 is stopped, and the decoding operation of the decoding unit 603 is stopped by the decoding control signal 6b.

Furthermore, the image memory 605 is controlled by the image memory control signal 6e to output a decoded image stored in the image memory 605, in place of an image which cannot be decoded because the encoded data is not supplied.

Thereafter, if the encoded data amount notice signal 6f exceeds the threshold L1, the code buffer memory 602 is controlled by the code buffer memory control signal 6a to restart to read out the data stored in the code buffer memory 602, and the decoding unit 603 is controlled by the decoding control signal 6b to restart the decoding operation. These operations are control operations for the code buffer memory and the image memory in order to prevent the underflow.

On the other hand, if the code buffer memory controller 601 detects, on the basis of an output of the comparator 6042, that the encoded data amount notice signal 6f becomes higher than the threshold L4, the code buffer memory controller 601 outputs the code buffer memory control signal 6a to the code buffer memory 602 when the decoding unit 603 has completed the decoding of a frame under decoding, so that a reading-out of the code buffer memory 602 is stopped, and the encoded data is thinned out in units of for example one frame which is hard to influence on the decoding. In addition, the code buffer memory controller 601 outputs the decoding control signal 6b to the decoding unit 603 so as to stop the decoding operation of the decoding unit 603. The code buffer memory controller 601 outputs the image memory control signal 6e to the image memory 605 so that a decoded image stored in the image memory is read out and outputted in place of a thinned-out image to be properly outputted.

Thereafter, if the encoded data amount notice signal 6f becomes lower than the threshold L4, the code buffer memory controller 601 outputs the code buffer memory control signal 6a to the code buffer memory 602 so that the encoded data stored in the code buffer memory 602 is read out again. In addition, the code buffer memory controller 601 outputs the decoding control signal 6b to the decoding unit 603 so as to restart the decoding operation of the decoding unit 603.

The above is the conventional control of the code buffer memory and the image memory for preventing the overflow.

In the MPEG (Moving Picture Experts Group) which is an internal standard for a moving picture compression system, a handling of the decoded image is different depending upon a method for predicting an image to be encoded. An image that was encoded within a frame without predicting on the basis of another image, is called an "I-picture". In the case of the I-picture, the image decoded by the decoding unit is stored in the image memory once, and thereafter, is outputted. An image that was encoded by predicting on the basis of a past image in a time sequence, is called a "P-picture". Similarly to the I-picture, in the case of the P-picture, the image decoded by the decoding unit is stored in the image memory once, and thereafter, is outputted. An image that was encoded by predicting on the basis of a past image and a future image in a time sequence, is called a "B-picture". In the case of the B-picture, the image decoded by the decoding unit is outputted without being stored in the image memory. The decoded images stored in the image memory of the decoding unit are used for prediction at the time of decoding the "P-picture" and the "B-picture".

As mentioned above, the decoded images stored in the image memory of the decoding unit includes only the "I-picture" and the "P-picture", and the "B-picture" is not stored in the image memory. For example, assume that the images outputted from the deeming unit are $I_1$, $B_2$, $B_3$, $B_4$, $B_5$, $B_6$, $P_7$, $B_8$, ..., in the time sequence as shown in ② in FIG. 4, and also assume that when the encoded data amount becomes lower than the threshold L1 in the course of the decoding of $B_3$ (point b) so that there occurs a fear of the underflow, the supplying of the encoded data is stopped during a period of two frames. The images outputted from the decoding unit becomes $I_1$, $B_2$, $B_3$, $I_1$, $I_1$, $B_4$, $B_5$, $B_6$, $P_7$, $B_8$, ..., in the time sequence as shown in ④ in FIG. 4. Namely, the image I1 stored in the image memory is outputted next to the image $B_3$ (point "e"), so that the image is returned a time of two frames ago in the time sequence, with the result that the decoded image becomes unnatural.

Furthermore, since the image B4 is outputted next to the image I1 (point "f"), the two continuous images are separated by a time of three frames in the time sequence, with the result that, at this point, the decoded image also becomes unnatural. Also, assuming that when the encoded data amount becomes higher than the threshold L4 in the course of the decoding of $B_3$ (point "b") so that there occurs a possibility of the overflow, and therefore, the images of two frames are thinned-out (e.g., erased), the images outputted from the decoding unit become $I_1$, $B_2$, $B_3$, $I_1$, $I_1$, $B_6$, $B_7$, $B_8$, ..., in the time sequence as shown in ⑥ in FIG. 4. Namely, the image $I_1$ is outputted next to the image $B_3$ (point "i"). In other words, the decoded image is moved back by two frames. As a result, the naturalness of the decoded image is lost. In addition, the image $B_6$ is outputted next to the image $I_1$ (point "j"). Since the image $B_6$ is separated from the image $I_1$ by five frames, naturalness is also lost at this point "j".

SUMMARY OF THE INVENTION

Accordingly, it is an object of the present invention to provide a system for controlling a code buffer memory and an image memory in an encoded image decoding system, which has overcome the above mentioned defect of the conventional one.

Another object of the present invention is to provide a system for controlling a code buffer memory and an image memory in an encoded image decoding system, which can minimize unnaturalness in a decoded image, by suppressing the above mentioned moving-back and jump of images in a time sequence, in an underflow preventing processing and an overflow preventing processing.

The above and other objects of the present invention are achieved in accordance with the present invention by a moving picture decoding control system comprising a buffer memory for accumulating encoded images, a decoding unit for decoding an I-picture (in-frame encoded image), a P-picture (forward predicted encoded image) and a B-picture (bidirectional predicted encoded image) outputted from the buffer memory, an image memory temporarily storing the I-picture and the P-picture decoded by the decoding unit, a comparator means for comparing the amount of codes accumulated in the buffer memory with tint and second thresholds set from an external, the first threshold being smaller than the second threshold, the moving picture decoding control system being so configured that when the amount of codes accumulated in the buffer memory is between the first and second thresholds, the reading-out of the buffer memory is stopped and the image memory is repeatedly read out just after the I-picture or the P-picture of one frame is decoded until the amount of codes accumulated in the buffer memory exceeds the second threshold, and when the amount of codes accumulated in the buffer memory is smaller than the first threshold, the reading-out of the buffer memory is stopped and the image memory is repeatedly read out until the amount of codes accumulated in the buffer memory exceeds the second threshold.

According to another aspect of the present invention, there is provided a moving picture decoding control system comprising a buffer memory for accumulating encoded images, a decoding unit for decoding an I-picture (in-frame encoded image), a P-picture (forward predicted encoded image) and a B-picture (bidirectional predicted encoded image) outputted from the buffer memory, an image memory temporarily storing the I-picture and the P-picture decoded by the decoding unit, a comparator means for comparing the amount of codes accumulated in the buffer memory with first and second thresholds set from an external, the first threshold being smaller than the second threshold, the moving picture decoding control system being so configured that when the amount of codes accumulated in the buffer memory is between the first and second thresholds, all codes read from the buffer memory are skipped and an image is outputted from the image memory in place of a frame corresponding the codes skipped, just after the I-picture or the P-picture of one frame is decoded until the amount of codes accumulated in the buffer memory becomes lower than the first threshold, and when the amount of codes accumulated in the buffer memory is larger than the second threshold, all codes read from the buffer memory are skipped and an image is outputted from the image memory in place of a frame corresponding to the codes skipped until the amount of codes accumulated in the buffer memory becomes lower than the first threshold.

According to still another aspect of the present invention, there is provided a moving picture decoding control system comprising a buffer memory for accumulating encoded images, a decoding unit for decoding an I-picture (in-frame encoded image), a P-picture (forward predicted encoded image) and a B-picture (bidirectional predicted encoded image) outputted from the buffer memory, an image memory temporarily storing the I-picture and the P-picture decoded by the decoding unit, a comparator means for comparing the amount of codes accumulated in the buffer memory with first and second thresholds set from an external, the first threshold being smaller than the second threshold, the moving picture decoding control system being so configured that when the amount of codes accumulated in the buffer memory is between the first and second thresholds, only codes of the B-picture read from the buffer memory are skipped and an image is outputted from the image memory in place of a frame corresponding the codes skipped, just after the I-picture or the P-picture of one frame is decoded until the amount of codes accumulated in the buffer memory becomes lower than the first threshold, and when the amount of codes accumulated in the buffer memory is larger than the second threshold, all codes read from the buffer memory are skipped and an image is outputted from the image memory in place of a frame corresponding to the codes skipped until the mount of codes accumulated in the buffer memory is between the first and second thresholds.

The above and other objects, features and advantages of the present invention will be apparent from the following description of preferred embodiments of the invention with reference to the accompanying drawings.

DESCRIPTION OF THE PREFERRED EMBODIMENTS

Figure 1:
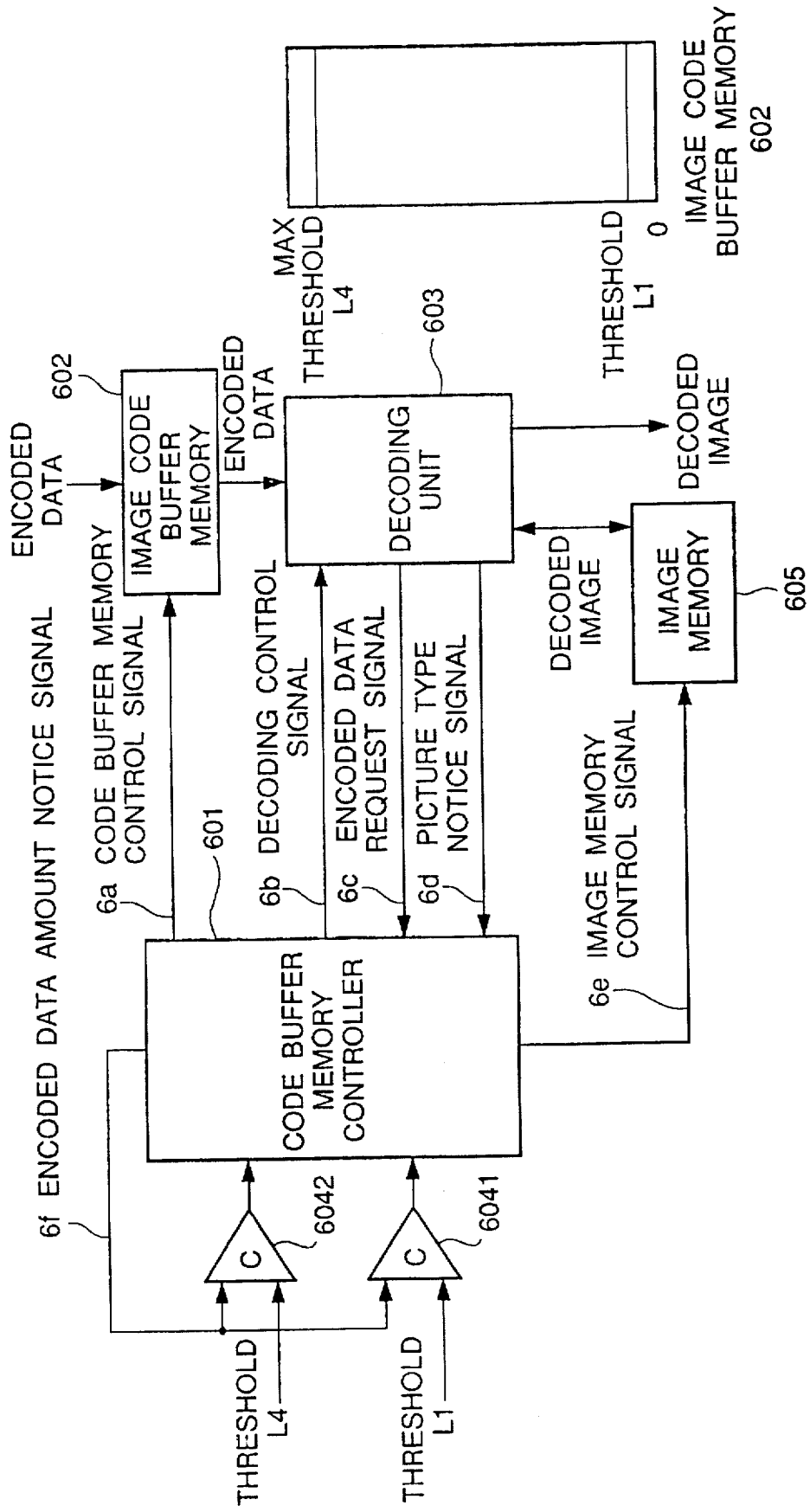
FIG. 1 is a block diagram of a conventional moving picture decoding control system.
Figure 2:
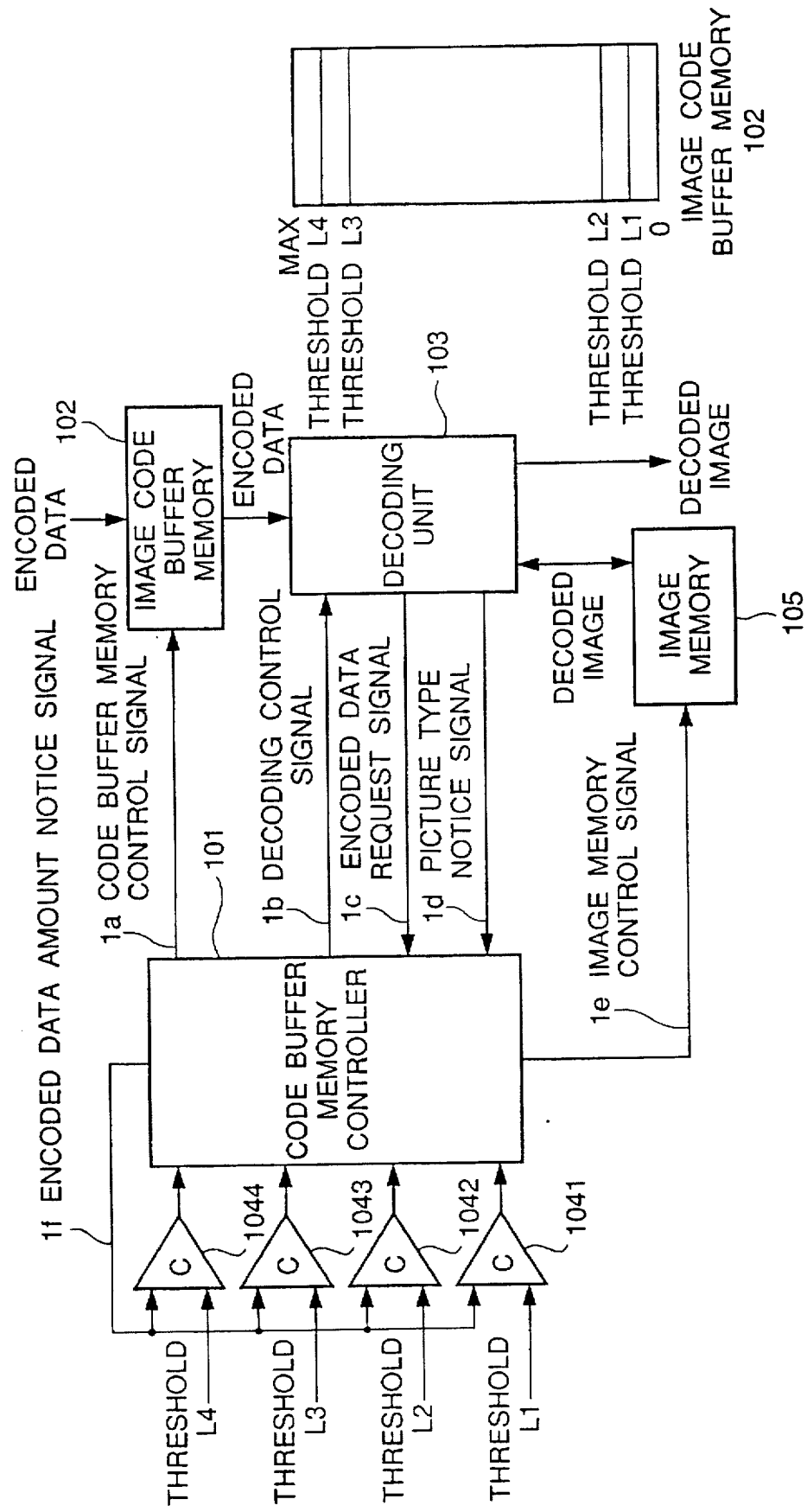
FIG. 2 is a block diagram of a first embodiment of the moving picture decoding control system in accordance with the present invention.

Referring to FIG. 2, there is shown a block diagram of a first embodiment of the moving picture decoding control system in accordance with the present invention.

In the shown embodiment, encoded data supplied through a transmission channel (not shown) is supplied to a code buffer memory 102, which in turn has an output connected to a decoding unit 103. A decoded image outputted from the decoding unit 103 is supplied to an image memory 105 and also outputted to an external unit. In addition, a decoded image read from the image memory 105 is supplied to the decoding unit 103. The decoding unit 103 outputs an encoded data request signal 1c and a picture type notice signal 1d to a code buffer memory controller 101.

The code buffer memory controller 101 outputs a code buffer memory control signal 1a to the code buffer memory 102, and also outputs a decoding control signal 1b to the decoding unit 103. Furthermore, the code buffer memory controller 101 outputs an image memory control signal 1e to the image memory 105, and supplies an encoded data amount notice signal 1f to one input of each of four comparators 1041, 1042, 1043 and 1044.

A first threshold L1 is supplied to the other input of the comparator 1041, and a second threshold L2 is supplied to the other input of the comparator 1042. A third threshold L3 is supplied to the other input of the comparator 1043, and a fourth threshold L4 is supplied to the other input of the comparator 1044. An output of each of the four comparators 1041, 1042, 1043 and 1044 is supplied to the code buffer memory controller 101. The first threshold L1 is set to the amount of encoded data stored in the code buffer memory 102 during a period of one frame. The second threshold L2 is set to the amount of encoded data stored in the code buffer memory 102 during a period of two frames. The third threshold L3 is set to a value obtained by subtracting the mount of encoded data stored in the code buffer memory 102 during a period of two frames, from a maximum storage capacity of the code buffer memory 102. The fourth threshold L4 is set to a value obtained by subtracting the amount of encoded data stored in the code buffer memory 102 during a period of one frame, from the storage capacity of the code buffer memory 102.

Figure 3:
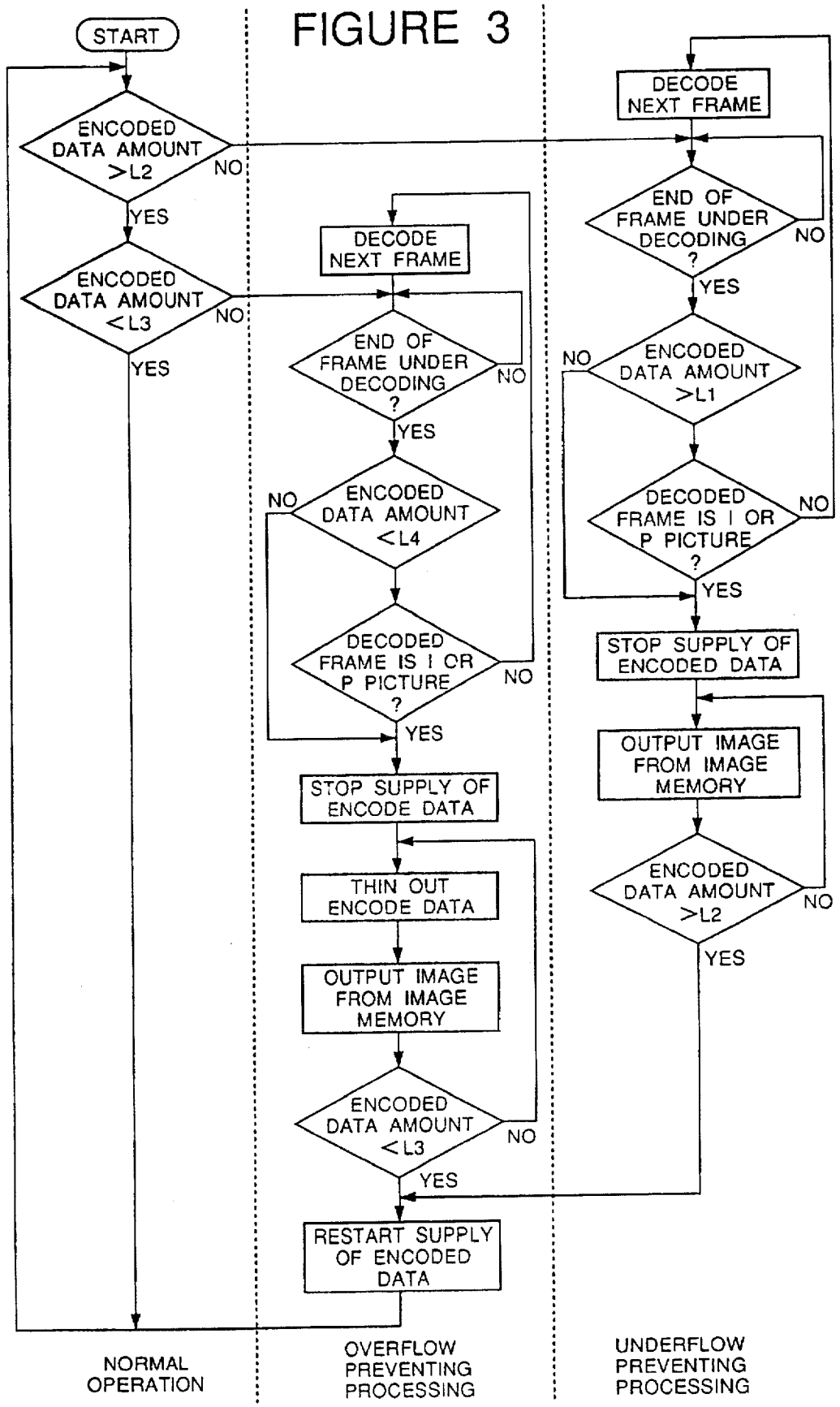
FIG. 3 is a flow chart illustrating an operation of the first embodiment.

Now, operation of the above mentioned first embodiment will be explained with reference to FIG. 3 which is a flow chart illustrating an operation of the first embodiment.

In a normal operation in which there is neither a fear of overflow nor a fear of underflow, the code buffer memory controller 101 controls the code buffer memory 102 by the code buffer memory control signal 1a so that the encoded data supplied through the transmission channel is written into the code buffer memory 102. On the other hand, the decoding unit 103 outputs the encoded data request signal 1c to the code buffer memory controller 101, and in response to the encoded data request signal 1c, the code buffer memory controller 101 controls the code buffer memory 102 by the code buffer memory control signal 1a so as to cause the code buffer memory 102 to output the encoded data to the decoding unit 103. The decoding unit 103 having received the encoded data, decodes the encoded data so as to generate a decoded image, and also generates the picture type notice signal 1d. If the code buffer memory controller 101 has known from picture type notice signal 1d from the decoding unit 103 that the decoded image is either the I-picture or the P-picture, the code buffer memory controller 101 controls the image memory by the image memory control signal 1e so as to write the decoded image into the image memory 105.

If it is designed that in this normal operation, the amount of the encoded data accumulated in the code buffer memory 102 varies between the second threshold L2 and the third threshold L3, neither the underflow nor the overflow occurs.

However, when the encoded data has changed in the transmission channel or when an error occurs in the decoding unit, or alternatively, when an actual difference between the transmission rate and the decoding rate is larger than a designed value, there is possibility that the underflow or the overflow occurs. For complying with such a situation, the code buffer memory and the image memory are controlled as shown in the flow chart of FIG. 3.

In the normal operation, the code buffer memory controller 101 continually monitors on the basis of the outputs of the four comparators 1041, 1042, 1043 and 1044 the large-and-small relation between the encoded data amount notice signal 1f and the thresholds L1, L2, L3 and L4, while controlling the normal decoding operation. If the situation develops under the following case "a" or "b", the code buffer memory controller 101 changes from the normal operation to an underflow preventing processing or an overflow preventing processing.

Case "a"

When the encoded data amount notice signal 1f is not larger than the threshold L2, the following under/low preventing processing is carried out.

Step 1

The completion of the decoding operation of a frame being decoded in the decoding unit 103 is awaited.

Step 2

If the encoded data amount notice signal 1f is not larger than the threshold L1, the operation goes to Step 4. Otherwise, the operation goes to Step 3.

Step 3

The code buffer memory controller 101 discriminates the picture type notice signal 1d outputted from the decoding unit 103, and if the decoding completed frame is either the I-picture or the P-picture, the operation goes to Step 4. Otherwise, the operation goes to Step 8.

Step 4

The code buffer memory controller 101 instructs the code buffer memory 102 by the code buffer memory control signal 1a to cause the code buffer memory 102 to stop supplying the encoded data to the decoding unit 103.

Step 5

In place of the image which cannot be outputted from the decoding unit 103 because the decoded data is not supplied to the decoding unit 103, the code buffer memory controller 101 controls the decoding unit 103 by the decoding control signal 1b so as to cause the decoding unit 103 to stop its decoding operation, and also controls the image memory 105 by the image memory control signal 1e so as to cause an image stored in the image memory 105 to be read out.

Step 6

If the encoded data amount notice signal 1f is not larger than the threshold L2, the operation goes to Step 5. Otherwise, the operation goes to Step 7.

Step 7

In order to restart the supply of the encoded data to the decoding unit 103, the code buffer memory controller 101 controls the code buffer memory 102 by the code buffer memory control signal 1a to cause the code buffer memory 102 to restart the reading-out operation. Then, the operation goes to Step 9.

Step 8

In order to decode a next frame, the code buffer memory controller 101 controls the code buffer memory 102 by the code buffer memory control signal 1a to cause the code buffer memory 102 to execute the reading-out operation. In addition, the code buffer memory controller 101 controls the decoding unit 103 by the decoding control signal 1b so as to cause the decoding unit 103 to decode the encoded data received from the code buffer memory 102. Then, the operation goes to the step 1.

Step 9

The code buffer memory controller 101 controls the decoding unit 103 by the decoding control signal 1b so as to cause the decoding unit 103 to restore the decoding operation. As a result, the operation returns to the normal decoding operation.

Case "b"

If the encoded data amount notice signal 1f is not smaller than the threshold L3, the following overflow preventing processing is performed.

Step 1

The completion of the decoding operation of a frame being decoded in the decoding unit 103 is awaited.

Step 2

If the encoded data amount notice signal 1f is not smaller than the threshold L4, the operation goes to Step 4. Otherwise, the operation goes to Step 3.

Step 3

The code buffer memory controller 101 discriminates the picture type notice signal 1d outputted from the decoding unit 103, and if the decoding completed frame is either the I-picture or the P-picture, the operation goes to Step 4. Otherwise, the operation goes to Step 9.

Step 4

The code buffer memory controller 101 instructs the code buffer memory 102 by the code buffer memory control signal 1a so as to cause the code buffer memory 102 to stop supplying the encoded data to the decoding unit 103.

Step 5

The code buffer memory controller 101 controls the code buffer memory 102 by the code buffer memory control signal 1a to cause the encoded data of one frame from the code buffer memory 102 to be thinned out (e.g. erased).

Step 6

The code buffer memory controller 101 controls the decoding unit 103 by the decoding control signal 1b so as to cause the decoding unit 103 to stop its decoding operation. In addition, in place of the image which cannot be outputted from the decoding unit 103 because the decoded data is thinned out in the Step 5, the code buffer memory controller 101 controls the image memory 105 by the image memory control signal 1e so as to cause an image stored in the image memory 105 to be read out.

Step 7

If the encoded data amount notice signal 1f is not smaller than the threshold L3, the operation goes to Step 5. Otherwise, the operation goes to Step 8.

Step 8

In order to restart the supply of the encoded data to the decoding unit 103, the code buffer memory controller 101 controls the code buffer memory 102 by the code buffer memory control signal 1a to cause the code buffer memory 102 to restart the reading-out operation. Then, the operation goes to Step 10.

Step 9

In order to decode a next frame, the code buffer memory controller 101 controls the code buffer memory 102 by the code buffer memory control signal 1a to cause the code buffer memory 102 to execute the reading-out operation. In addition, the code buffer memory controller 101 controls the decoding unit 103 by the decoding control signal 1b so as to cause the decoding unit 103 to decode the encoded data received from the code buffer memory 102. Then, the operation goes to step 1.

Step 10

The code buffer memory controller 101 controls the decoding unit 103 by the decoding control signal 1b so as to cause the decoding unit 103 to restore the decoding operation. As a result, the operation returns to the normal decoding operation.

Figure 4:
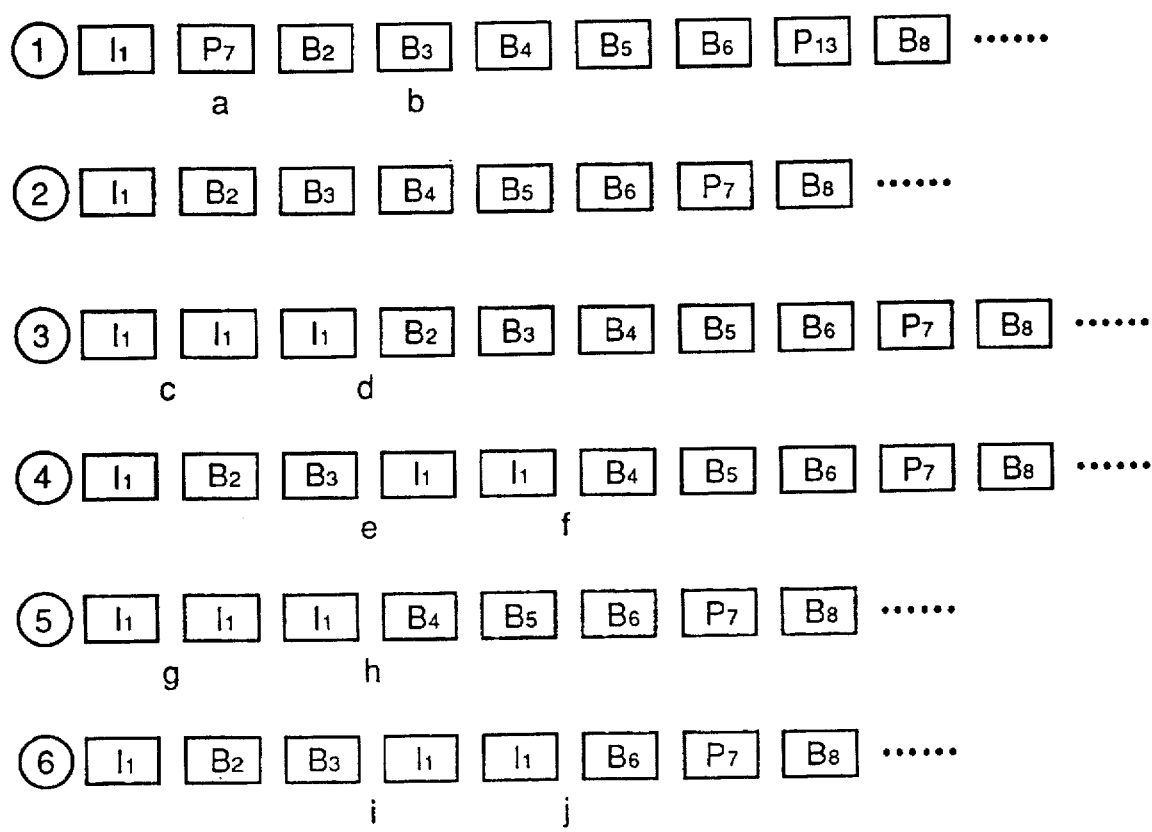
FIG. 4. illustrates examples of images outputted from the decoding unit.

Now, examples of the outputted image in this embodiment will be explained with reference to FIG. 4 illustrating examples of images outputted from the decoding unit.

In FIG. 4, the image sequence ① shows the transmitted order of the encoded data In designates an I-picture outputted as a decoded image at an (n)th place. $P_n$ shows a P-picture outputted as a decoded image at an (n)th place. In addition, $B_n$ indicates a B-picture outputted as a decoded image at an (n)th place. In addition, the image sequence ② shows the order of the decoded images outputted from the decoding unit when it is unnecessary to perform either the underflow preventing processing or the overflow preventing processing.

Now, assume that when the decoding operation is continuously performed, the encoded data amount accumulated in the code buffer memory becomes lower than the threshold L2 at a time "a", and also becomes lower than the threshold L1 at a time "b". Also assume that when the underflow preventing processing is executed in this embodiment and in accordance with the conventional example explained hereinbefore, the encoded data amount becomes higher than the threshold L2 during a period of two frames in accordance with this embodiment, and becomes higher than the threshold L1 during a period of two frames in accordance with the conventional example. Thereafter, the underflow preventing processing becomes unnecessary. Under these conditions, the sequence of images outputted from the decoding unit in this embodiment becomes as shown in ③ of FIG. 4, and the sequence of images outputted from the decoding unit in the conventional example becomes as shown in ④ of FIG. 4.

In this embodiment, the encoded data amount becomes lower than the threshold L2 at the time "a", and when the decoding of $P_7$ is completed, the supply of the encoded data is stopped. In place of the image which cannot be decoded because the encoded data is not supplied to the decoding unit, the image $I_1$ stored in the image memory 105 is read out and outputted. Since the encoded data amount becomes higher than the threshold L2 during the period of two frames, the image $I_1$ is outputted two times. Thereafter, the operation returns to the normal decoding operation, so that the images are outputted in the order shown in ③ of FIG. 4.

In the conventional example, on the other hand, the encoded data amount becomes lower than the threshold L1 at the time "b", and when the decoding of $B_3$ is completed, the supply of the encoded data is stopped. In place of the image which cannot be decoded because the encoded data is not supplied to the decoding unit, the image $I_1$ stored in the image memory 105 is read out and outputted. Since the encoded data amount becomes higher than the threshold L1 during the period of two frames, the image $I_1$ is outputted two times. Thereafter, the operation returns to the normal decoding operation, so that the images are outputted in the order shown in ④ of FIG. 4.

Furthermore, assume that when the decoding operation is continuously performed, the encoded data amount accumulated in the code buffer memory becomes higher than the threshold L3 at a time "a", and also becomes higher than the threshold L4 at a time "b". Also assume that when the overflow preventing processing is executed in this embodiment and in accordance with the conventional example explained hereinbefore, the encoded data amount becomes lower than the threshold L3 during a period of two frames in accordance with this embodiment, and becomes lower than the threshold L4 during a period of two frames in accordance with the conventional example. Thereafter, the overflow preventing processing becomes unnecessary. Under these conditions, the sequence of images outputted from the decoding unit in this embodiment becomes as shown in ⑤ of FIG. 4, and the sequence of images outputted from the decoding unit in the conventional example becomes as shown in ⑥ of FIG. 4.

In this embodiment, the encoded data amount becomes higher than the threshold L3 at the time "a", and when the decoding of $P_7$ is completed, the supply of the encoded data is stopped, and the encoded data for the next image $B_2$ is thinned out or deleted. In place of the image $B_2$ which cannot be decoded because it is thinned out or deleted, the image $I_1$ stored in the image memory 105 is read out and outputted. Since the encoded data amount becomes lower than the threshold L3 during the period of two frames, the image B3 is also thinned out or deleted. Therefore, the image $I_1$ is outputted two times. Thereafter, the operation returns to the normal decoding operation, so that the images are outputted in the order shown in ⑤ of FIG. 4.

In the conventional example, on the other hand, the encoded data amount becomes higher than the threshold L4 at the time "b", and when the decoding of $B_3$ is completed, the supply of the encoded data is stopped, and the encoded data for the next image $B_4$ is thinned out or deleted. In place of the image $B_4$ which cannot be decoded because it is thinned out or deleted, the image $I_1$ stored in the image memory 105 is read out and outputted. Since the encoded data amount becomes lower than the threshold L4 during the period of two frames, the image $B_5$ is also thinned out or deleted. Therefore, the image $I_1$ is outputted two times. Thereafter, the operation returns to the normal decoding operation, so that the images are outputted in the order shown in ⑥ of FIG. 4.

Figure 5:
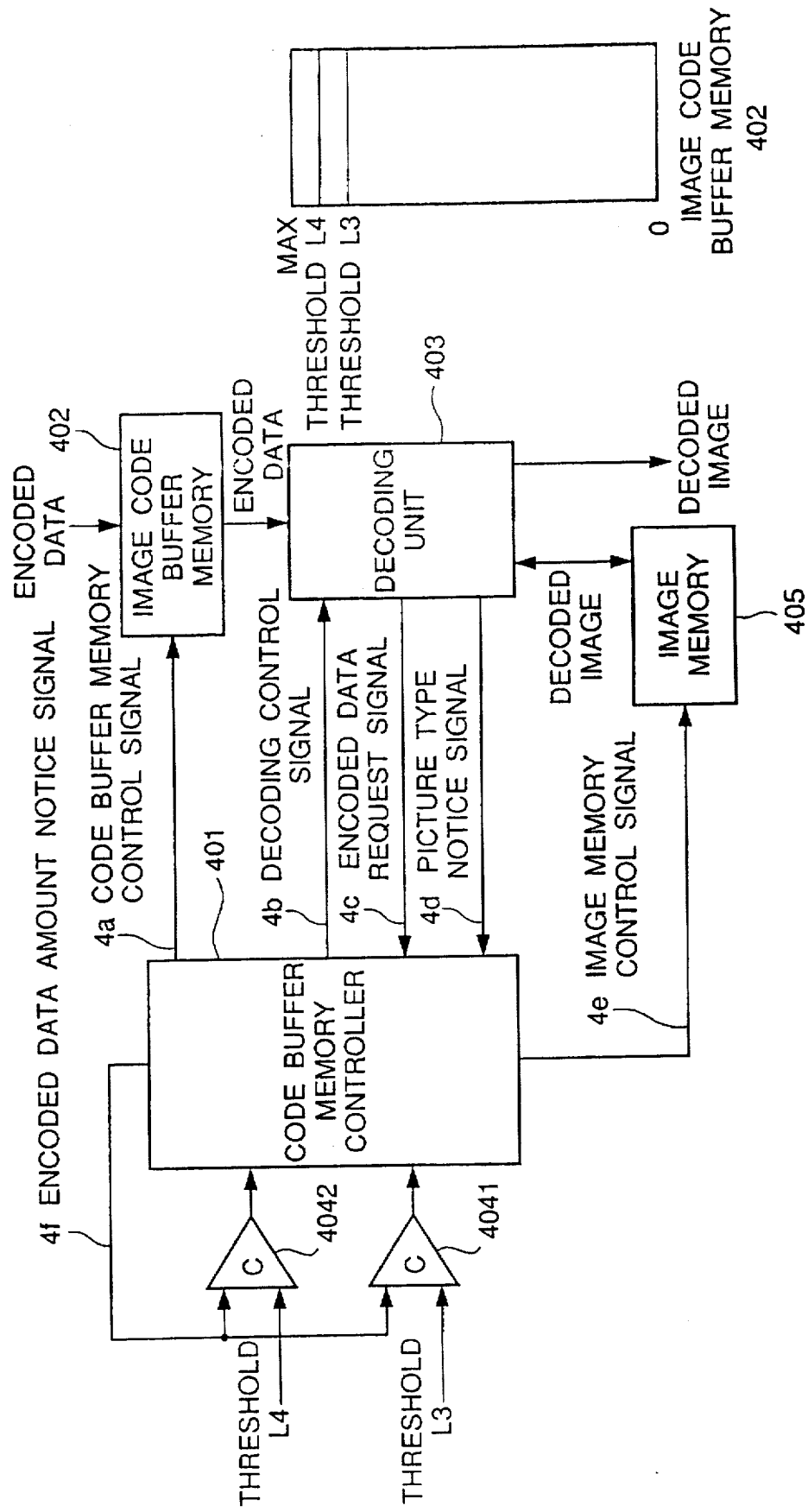
FIG. 5 is a block diagram of a second embodiment of the moving picture decoding control system in accordance with the present invention.

Referring to FIG. 5, there is shown a block diagram of a second embodiment of the moving picture decoding control system in accordance with the present invention. The second embodiment shown in FIG. 5 is a modification of the first embodiment shown in FIG. 2 in which the means for the underflow preventing processing is removed so that only the overflow preventing processing is executed.

In the second embodiment, encoded data supplied through a transmission channel (not shown) is supplied to a code buffer memory 402, which in turn has an output connected to a decoding unit 403. A decoded image outputted from the decoding unit 403 is supplied to an image memory 405 and also outputted to an external unit. In addition, a decoded image read from the image memory 405 is supplied to the decoding unit 403. The decoding unit 403 outputs an encoded data request signal 4c and a picture type notice signal 4d to a code buffer memory controller 401.

The code buffer memory controller 401 outputs a code buffer memory control signal 4a to the code buffer memory 402, and also outputs a decoding control signal 4b to the decoding unit 403. Furthermore, the code buffer memory controller 401 outputs an image memory control signal 4e to the image memory 405, and supplies an encoded data amount notice signal 4f to one input of each of two comparators 4041 and 4042.

A threshold L3 is supplied to the other input of the comparator 4041, and another threshold L4 is supplied to the other input of the comparator 4042. An output of each of the two comparators 4041 and 4042 is supplied to the code buffer memory controller 401. The threshold L3 is set to a value obtained by subtracting the amount of encoded data stored in the code buffer memory 402 during a period of two frames, from a maximum storage capacity of the code buffer memory 402. The threshold L4 is set to a value obtained by subtracting the mount of encoded data stored in the code buffer memory 402 during a period of one frame, from the storage capacity of the code buffer memory 402.

Figure 6:
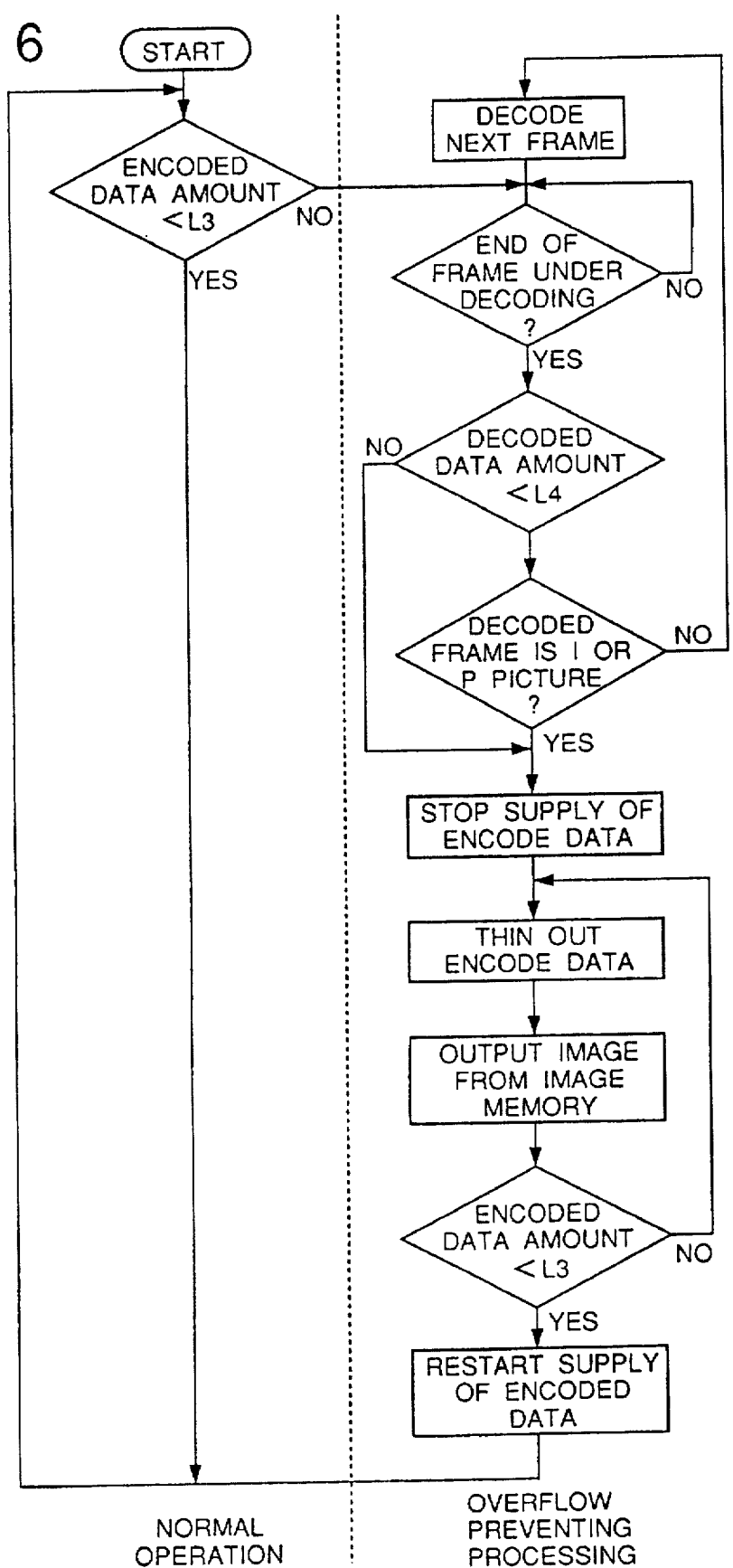
FIG. 6 is a flow chart illustrating an operation of the second embodiment.

Now, operation of the above mentioned second embodiment will be explained with reference to FIG. 6 which is a flow chart illustrating an operation of the second embodiment.

In a normal operation, the code buffer memory controller 401 controls the code buffer memory 402 by the code buffer memory control signal 4a so that the encoded data supplied through the transmission channel is written into the code buffer memory 402. On the other hand, the decoding unit 403 outputs the encoded data request signal 4c to the code buffer memory controller 401, and in response to the encoded data request signal 4e, the code buffer memory controller 401 controls the code buffer memory 402 by the code buffer memory control signal 4a so as to cause the code buffer memory 402 to output the encoded data to the decoding unit 403. The decoding unit 403 having received the encoded data, decodes the encoded data so as to generate a decoded image, and also generates the picture type notice signal 4d. If the code buffer memory controller 401 has known from picture type notice signal 4d from the decoding unit 403 that the decoded image is either the I-picture or the P-picture, the code buffer memory controller 401 controls the image memory 405 by the image memory control signal 4e so as to write the decoded image into the image memory 405.

If it is designed that in this normal operation, the amount of the encoded data accumulated in the code buffer memory 402 is maintained to be under the threshold L3, the overflow does not occur.

However, when the encoded data has changed in the transmission channel or when an error occurs in the decoding unit, or alternatively, when the transmission rate is extremely higher than the decoding rate, them is a possibility that the overflow occurs. For complying with such a situation, the code buffer memory and the image memory are controlled as shown in the flow chart of FIG. 6.

In the normal operation, the code buffer memory controller 401 continually monitors on the basis of the outputs of the comparators 4041 and 4042 the large-and-small relation between the encoded data amount notice signal 4f and the thresholds L3 and L4, while controlling the normal decoding operation. If the situation develops under the following case "a", the code buffer memory controller 401 changes from the normal operation to an overflow preventing processing.
Case "a"

If the encoded data amount notice signal 4f is not smaller than the threshold L3, the following overflow preventing processing is performed.
Step 1

The completion of the decoding operation of a frame being decoded in the decoding unit 403 is awaited.
Step 2

If the encoded data amount notice signal 4f is not smaller than the threshold L4, the operation goes to Step 4. Otherwise, the operation goes to Step 3.
Step 3

The code buffer memory controller 401 discriminates the picture type notice signal 4d outputted from the decoding unit 403, and if the decoding completed frame is either the I-picture or the P-picture, the operation goes to Step 4. Otherwise, the operation goes to Step 9.
Step 4

The code buffer memory controller 401 instructs the code buffer memory 402 by the code buffer memory control signal 4a so as to cause the code buffer memory 402 to stop supplying the encoded data to the decoding unit 403.
Step 5

The code buffer memory controller 401 controls the code buffer memory 402 by the code buffer memory control signal 4a to cause the encoded data of one frame from the code buffer memory 402 to be thinned-out (e.g., erased).
Step 6

The code buffer memory controller 401 controls the decoding unit 403 by the decoding control signal 4b so as to cause the decoding unit 403 to stop its decoding operation. In addition, in place of the image which cannot be outputted from the decoding unit 403 because the decoded data is not supplied, the code buffer memory controller 401 controls the image memory 405 by the image memory control signal 4e so as to cause an image stored in the image memory 405 to be read out.
Step 7

If the encoded data amount notice signal 4f is not smaller than the threshold L3, the operation goes to Step 5. Otherwise, the operation goes to Step 8.
Step 8

In order to restart the supply of the encoded data to the decoding unit 403, the code buffer memory controller 401 controls the code buffer memory 402 by the code buffer memory control signal 4a to cause the code buffer memory 402 to restart the reading-out operation. Then, the operation goes to Step 10.
Step 9

In order to decode a next frame, the code buffer memory controller 401 controls the code buffer memory 402 by the code buffer memory control signal 4a to cause the code buffer memory 402 to execute the reading-out operation. In addition, the code buffer memory controller 401 controls the decoding unit 403 by the decoding control signal 4b so as to cause the decoding unit 403 to decode the encoded data received from the code buffer memory 402. Then, operation goes to step 1.
Step 10

The code buffer memory controller 401 controls the decoding unit 403 by the decoding control signal 4b so as to cause the decoding unit 403 to restore the decoding operation. As a result, the operation returns to the normal decoding operation.

As will be seen from the above, the sequence of images outputted from the second embodiment is the same as that of images outputted when the overflow preventing processing is executed in the first embodiment.

As apparent from above, the moving picture decoding control system in accordance with the present invention has a plurality of thresholds for each of the underflow preventing processing and the overflow preventing processing, and is so configured that different processing are performed depending upon the decoded data amount compared with the thresholds.

In the underflow preventing processing, when the amount of encoded data accumulated in the code buffer memory is still relatively great (namely, it becomes lower than the threshold L2), the supply of the encoded data to the decoding unit is stopped so that the decoding operation is temporarily stopped. However, since the decoding is stopped just after the decoding of the I-picture or the P-picture is completed, the image ($I_1$) just before the decoding operation is stopped can become the same as the image ($I_1$) outputted during a period of time in which the decoding operation is being stopped, as shown at the timing "c" in ③ of FIG. 4. Accordingly, the image is never moved back in time sequence. In addition, no skip exists between the image ($I_1$) outputted during a period of time in which the decoding operation is being stopped, and the image ($B_2$) outputted after the decoding operation is restarted, at the timing "d" in ③ of FIG. 4.

Accordingly, unnatural images are minimized, in comparison with the conventional underflow preventing processing (the image is moved back in time sequence by two frames at the timing "e" in ④ of FIG. 4, and the image is skipped by three frames at the timing "f" in ④ of FIG. 4).

Furthermore, after the encoded data amount becomes lower than the threshold L2, if the encoded data amount becomes lower than the threshold L1 when the I-picture or the P-picture is awaited, the decoding of the next image is unconditionally stopped similarly to the conventional example. Therefore, the underflow will never occur.

In the overflow preventing processing, when the amount of encoded data accumulated in the code buffer memory is still relatively great (namely, it becomes higher than the threshold L3), the decoding operation is temporarily stopped and the encoded data is thinned out. However, since the decoding is stopped just after the decoding of the I-picture or the P-picture is completed, the image ($I_1$) just before the decoding operation is stopped can become the same as the image ($I_1$) outputted during a period of time in which the decoding operation is being stopped, as shown at timing "g" in ⑤ of FIG. 4. Accordingly, the image is never moved back in time sequence. In addition, the skip between the image ($I_1$) outputted during a period of time in which the decoding operation is being stopped, and the image ($B_4$) outputted after the decoding operation is restarted, is relatively small at the timing "h" in ⑤ of FIG. 4.

Accordingly, unnatural images are minimized, in comparison with the conventional overflow preventing processing (the image is moved back in time sequence by two frames at the timing "i" in ⑥ of FIG. 4, and the image is skipped by five frames at the timing "j" in ⑥ of FIG. 4).

Furthermore, after the encoded data amount becomes higher than the threshold L3, if the encoded data amount becomes higher than the threshold L4 when the I-picture or the P-picture is awaited, the decoding of the next image is unconditionally stopped and the decoded data is immediately thinned out, similarly to the conventional example. Therefore, the overflow will never occur.

Alternatively, if only the B-pictures are thinned out or deleted when the amount of encoded data accumulated in the code buffer memory is between the threshold L3 and the threshold L4, the I-picture and the P-picture are decoded in the course of the overflow preventing processing, and as soon as the decoded image is outputted, the decoded image is written into the image memory. In this case, unnatural images are further minimized. In addition, it is possible to properly decode the predicted encoded image (P-picture and B-picture) to be decoded just after the overflow preventing processing is completed.

As seen from the above, the system in accordance with the present invention for controlling the code buffer memory and the image memory can minimize the moving-back of the image in the time sequence and the skip of the image in the time sequence, the underflow and/or overflow preventing processing, with the result that unnatural images can be minimized. In addition, even if the code buffer memory does not have a sufficient storage capacity, and therefore, the overflow preventing processing is frequently carried out, it is possible to reduce the unnaturalness of the decoded image.

The invention has thus been shown and described with reference to the specific embodiments. However, it should be noted that the present invention is in no way limited to the details of the illustrated structures but changes and modifications may be made within the scope of the appended claims.

I claim:

1. A moving picture decoding control system comprising:

a buffer memory for accumulating encoded images, a decoding unit for decoding an I-picture (in-frame encoded image), a P-picture (forward predicted encoded image) and a B-picture (bidirectional predicted encoded image) outputted from the buffer memory, an image memory temporarily storing the I-picture and the P-picture decoded by the decoding unit, and comparator means for comparing the amount of codes accumlated in the buffer memory with first and second thresholds set from an external unit, the first threshold being smaller than the second threshold, the moving picture decoding control system being configured so that when the amount of codes accumulated in the buffer memory is between the first and second thresholds, the reading-out of the buffer memory is stopped, and the image memory is repeatedly read-out just after the I-picture or the P-picture of one frame is decoded by said decoding unit until the amount of codes accumulated in the buffer memory exceeds the second threshold, and when the amount of codes accumulated in the buffer memory is smaller than the first threshold, the reading-out of the buffer memory is stopped, the image memory is repeatedly read-out until the amount of codes accumulated in the buffer memory exceeds the second threshold, wherein an image outputted from said decoding unit is a continuation of either of said I-picture and said P-picture decoded thereby, so as to prevent either of a returning-back of the image in a time sequence and a skipping of the image during a time period in which a decoding operation is being stopped.

2. A moving picture decoding control system comprising:

a buffer memory for accomulating encoded images;

a decoding unit for decoding an I-picture (in-frame encoded image), a P-picture (forward predicted encoded image) and a B-picture (bidirectional predicted encoded image) outputted from the buffer memory;

a an image memory temporarily storing the I-picture and the P-picture decoded by the decoding unit; and comparator means for comparing the amount of codes accumulated in the buffer memory with first and second thresholds set from an external unit, the first threshold being smaller than the second threshold, the moving picture decoding control system being configured so that when the amount of codes accumulated in the buffer memory is between the first and second thresholds, all codes read from the buffer memory are skipped, and an image is outputted from the image memory in place of a frame corresponding to the codes skipped, just after the I-picture or the P-picture of one frame is decoded by said decoding unit until the amount of codes accumlated in the buffer memory becomes lower than the first threshold, and when the amount of codes accumulated in the buffer memory is larger than the second threshold, all codes read from the buffer memory are skipped, and an image is outputted from the image memory in place of a frame corresponding to the codes skipped until the amount of codes accumulated in the buffer memory becomes lower than the first threshold, wherein an image outputted from said decoding unit is a continuation of either of said I-picture and said P-picture decoded thereby, so as to prevent either of a returning-back of the image in a time sequence and a skipping of the image during a time period in which a decoding operation is being stopped.

* * * * *